United States Patent Office 3,068,306
Patented Dec. 11, 1962

3,068,306
PROCESS FOR PREPARING AN OILY POLYMER FROM A MIXTURE OF PROPYLENE AND ETHYLENE
Russell G. Hay, Gibsonia, Leo F. Meyer, Pittsburgh, and Charles M. Selwitz, Pitcairn, Pa., assignors to Gulf Research & Development Company, Pittsburgh, Pa., a corporation of Delaware
No Drawing. Filed June 24, 1960, Ser. No. 38,416
3 Claims. (Cl. 260—683.15)

This invention relates to a process for producing low molecular weight oily polymers suitable for use as motor lubricants.

The oily polymers of this invention are obtained by polymerizing a mixture of olefins comprising propylene and no more than about 15 molar percent of ethylene in the presence of a catalyst system comprising a major amount of salt of a transition metal and a minor amount of an organo aluminum halide. The oily polymer produced herein is more suitable for use as a motor lubricant than an oily polymer produced from propylene alone, since it possesses a higher viscosity index and a lower pour point than does the polymer made from propylene alone.

One of the components of the catalyst system is a salt of a transition metal. By "transition" metal we intend to include titanium, zirconium, hafnium, vanadium, niobium, tin, lead, arsenic, antimony, tantalum, bismuth, chromium, molybdenum and tungsten. The anionic portion thereof can include a halide such as chloride, bromide and iodide. Examples of such salts which can be employed are titanium tetrachloride, titanium tetrabromide, zirconium tetraiodide, hafnium tetrabromide, vanadium tetrachloride, niobium pentabromide, tin tetrachloride, lead tetrachloride, arsenic pentaiodide, antimony pentachloride, tantalum pentachloride, bismuth, triiodide, chromium bromide, molybdenum pentachloride, tungsten hexachloride, etc. Titanium tetrachloride is the preferred salt of a transition metal.

The second component of the catalyst system is an organo aluminum halide embraced by the following general formula: $R_aAlX_b$, wherein R can be an aromatic radical such as phenyl, tolyl, xylyl, etc.; or an alkyl group having from one to 10 carbon atoms, preferably one to four carbon atoms, such as methyl, ethyl, propyl, isopropyl, isobutyl, normal butyl, etc.; X is a halogen atom selected from the group consisting of bromine, chlorine, and iodine; and $a$ and $b$ are values from one to two. Examples of organo aluminum halides which can be employed are methyl aluminum dichloride, ethyl aluminum dichloride, n-propyl aluminum dichloride, n-butyl aluminum dichloride, t-butyl aluminum dichloride, ethyl aluminum dibromide, di-n-propyl aluminum chloride, 3-methylhexyl aluminum sesquiiodide, methyl aluminum sesquichloride, ethyl aluminum sesquichloride, isobutyl aluminum sesquibromide, dimethyl aluminum iodide, phenyl aluminum dichloride, ditolyl aluminum bromide, etc.

Most important in obtaining the oily polymers of this invention are the relative amounts employed of the components of the catalyst system. In order to obtain an oily polymer, and not a solid polymer, as well as excellent yields thereof, it is absolutely important that the molar ratios of the transition metal to aluminum be at least about 1:1 and no more than about 9:1, but preferably be about 3:2 to about 4:1. The total mols of catalyst employed must be about 5 to about 100 millimols per liter of solvent, which solvent will be hereinafter defined.

The process of this invention is carried out in a solvent which is inert under the reaction conditions. Since there is a tendency for alkylation to occur in the presence of aromatic compounds, such compounds are not desirable. Solvents which can be employed are propane, butane, isobutane, n-pentane, isopentane, neopentane, cyclopentane, hexane, methylcyclopentane, cyclohexane, 2,3-dimethylbutane, etc.

If ethylene alone is subjected to the reaction herein defined a solid polymer will be produced. Propylene alone will result in an oily polymer. However, when the propylene polymerization is carried out in the presence of no more than about 15 molar percent but preferably about 3 to about 10 molar percent (based on the propylene) of ethylene an oily polymer having motor lubricant characteristics superior to the propylene polymer is obtained. In the event ethylene in amounts in excess of 15 molar percent are employed excessive amounts of solid polymers thereof are obtained. These polymers must be removed from the oily polymer before the product can be employed as a motor lubricant, but can be removed therefrom only with difficulty. This difficulty can be avoided by maintaining less than 15 molar percent of ethylene in the olefin feed. The total amount of olefin employed is about 0.01 to about 1.0 mol per millimol of total catalyst.

Temperature and pressure are not critical but can be varied over a wide range. Thus the temperature can be about 0° to about 300° C., preferably about 50° to about 100° C., and the pressure about 0 to about 500 pounds per square inch gauge, preferably about 100 to about 150 pounds per square inch gauge. The residence time can be, for example, about ¼ to about 10 hours, preferably about one to about four hours.

In carrying out the reaction the components of the catalyst system are added to the solvent. The mixture is then raised to reaction temperature and pressure, after which the olefin mixture, either batch or continuously, is added thereto. At the end of the reaction period sufficient material containing an active hydrogen, such as water, methanol, acetic acid, etc., is added to the reaction mixture for the purpose of deactivating the catalyst. With the addition of the material containing an active hydrogen two layers result. The layer containing the catalyst residue will constitute the lower layer, while the upper layer will include the desired oily polymer. The two layers are thereafter separated by any convenient means, for example, decantation, and the upper layer subjected to distillation to separate undesired light ends and solvent from the desired oily polymer.

The invention can further be illustrated by reference to the following examples.

*Example 1*

274 grams (400 cc.) of heptane, which had been distilled and then stored over sodium to remove water, were added to a one-liter autoclave which had been swept with nitrogen. First 0.26 gram (0.22 cc.) of methyl aluminum sesquichloride representing a molar ratio of titanium to aluminum of 3:1, and then 1.42 grams (0.82 cc.) of titanium tetrachloride were added to the solvent. The mixture of solvent and catalyst was stirred for about 5 minutes while heating the mixture to bring the temperature to 75° C. 180 grams of propylene were added to the mixture and the pressure of the mixture as a result thereof was raised to 120 pounds per square inch gauge. The reaction temperature was maintained at 75° C. for four hours. At the end of this period the autoclave was degassed to remove excess unreacted propylene and about 40 grams (50 cc.) of methanol were added to the autoclave in order to deactivate the catalyst and the mixture was placed in a separatory funnel, wherein two layers of product were formed. The upper layer, constituting the heptane solvent and the polymer product, was separated from the methanol catalyst lower layer and thereafter flash distilled to remove heptane therefrom. The polymer product was an oil weighing 112 grams with a viscosity index of 91, a pour point of —55° F. and a viscosity in centistokes at 100° F. and 210° F. of 48.99 and 6.55, respectively.

*Example II*

The run of Example I was repeated except that 180 grams of feed consisting of 96 molar percent propylene and four molar per cent ethylene were used, and the temperature was maintained at 85° C. throughout. 96 grams of an oily polymer product were obtained having a viscosity index of 98, a pour point of —75° F. and a viscosity in centistokes at 100° F. and 210° F. of 36.67 and 5.59., respectively.

*Example III*

In this run the conditions of the above example were maintained with the exception of the feed which amounted to 180 grams and consisted of 90 molar percent propylene and 10 molar percent ethylene. 90 grams of an oily polymer were obtained having a viscosity index of 111, a pour point of —60° F. and a viscosity in centistokes at 100° F. and 210° F. of 32.82 and 5.55, respectively.

*Example IV*

Again the conditions of the above runs were maintained except that 180 grams of feed consisting of 85 molar percent propylene and 15 molar per cent ethylene were employed. This time 83 grams of oily polymer were recovered having a viscosity index of 111, a pour point of —60° F. and a viscosity in centistokes at 100° F. and 210° F. of 38.15 and 5.98, respectively.

A typical highly refined paraffinic SAE 20 mineral oil has a viscosity index of 110, a pour point of —50° F. and a viscosity at 100° F. of between 37.9 and 84.6 centistokes and a viscosity at 210° F. of between 5.7 and 9.6 centistokes. The determinations defined hereinabove were made in accordance with the following: viscosity index ASTM D-97, pour point ASTM D-567, and viscosity ASTM D-445.

The advantages of operating in accordance with the process of this invention are apparent from the above. Note that the addition of but a small and controlled amount of ethylene in the olefin feed results in an oily polymer of motor lubricant characteristics having a significantly improved viscosity index and pour point over those of the propylene polymer alone. The amount of ethylene employed, as the data show, will determine the specific characteristic, viscosity index or pour point, desired in the final lubricant. In no event, however, must more than about 15 mole percent of ethylene be employed, for as noted hereinabove, the use of ethylene in amounts greater than about 15 percent in the feed results in an oily product having excessive amounts of solids. These solids, being in the form of fines, are difficult to separate from the oily polymer. They must be removed from the oily polymer, however, if the same is to be employed as a lubricant. By operating in accordance with the process herein described and defined a suitable motor lubricant free from such fines is obtained.

Obviously, many modifications and variations of the invention, as hereinabove set forth, can be made without departing from the spirit and scope thereof and therefore only such limitations should be imposed as are indicated in the appended claims.

We claim:

1. A process for preparing a low molecular weight oily polymer suitable for use as a motor lubricant which comprises polymerizing a mixture comprising propylene and ethylene, wherein the amount of ethylene relative to the propylene is about three to about 15 molar percent thereof, in an inert saturated hydrocarbon solvent in the presence of a catalyst system containing titanium tetrachloride and an alkyl aluminum chloride wherein the molar ratio of titanium to aluminum is about 3:2 to about 4:1.

2. A process for preparing a low molecular weight oily polymer suitable for use as a motor lubricant which comprises polymerizing a mixture comprising propylene and ethylene, wherein the amount of ethylene relative to the propylene is about three to about 15 molar percent thereof, in an inert saturated hydrocarbon solvent in the presence of a catalyst system containing titanium tetrachloride and an alkyl aluminum sesquichloride wherein the molar ratio of titanium to aluminum is about 3:2 to about 4:1.

3. A process for preparing a low molecular weight oily polymer suitable for use as a motor lubricant which comprises polymerizing a mixture comprising propylene and ethylene, wherein the amount of ethylene relative to the propylene is about three to about 15 molar percent thereof, in an inert saturated hydrocarbon solvent in the presence of a catalyst system containing titanium tetrachloride and methyl aluminum sesquichloride wherein the molar ratio of titanium to aluminum is about 3:2 to about 4:1.

References Cited in the file of this patent

UNITED STATES PATENTS

| | | |
|---|---|---|
| 2,907,805 | Bestian et al. | Oct. 6, 1959 |
| 2,929,808 | Ross et al. | Mar. 22, 1960 |
| 2,967,206 | Stuart et al. | Jan. 3, 1961 |
| 3,007,904 | Kreuter et al. | Nov. 7, 1961 |